United States Patent [19]

Deveau et al.

[11] Patent Number: 5,249,085
[45] Date of Patent: Sep. 28, 1993

[54] RECORDING SYSTEM USING MULTIPLEXED INPUTS TO A MULTICHANNEL RECORDER

[75] Inventors: David M. Deveau, Portsmouth, R.I.; Victor A. Andersen, North Darthmouth, Mass.

[73] Assignee: The United States of America as represented by the Secretary of the Navy, Washington, D.C.

[21] Appl. No.: 772,186

[22] Filed: Oct. 7, 1991

[51] Int. Cl.$^5$ .............................................. G11B 5/00
[52] U.S. Cl. ........................................ 360/32; 360/51; 328/129.1
[58] Field of Search ............... 360/32, 51; 377/107, 377/44; 328/129.1

[56] References Cited

U.S. PATENT DOCUMENTS

| | | | |
|---|---|---|---|
| 2,583,983 | 1/1952 | Arndt et al. | 360/30 X |
| 3,034,111 | 5/1962 | Hoagland et al. | 360/77.07 |
| 3,277,453 | 10/1966 | Michel | 360/47 |
| 3,789,138 | 1/1974 | Terada | 360/10.3 |
| 3,855,617 | 12/1974 | Jankowski et al. | 360/32 |
| 4,084,127 | 4/1978 | Tults | 328/129.1 |
| 4,501,005 | 2/1985 | Miller | 328/129.1 |
| 4,575,773 | 3/1986 | Dymond et al. | 360/32 |

OTHER PUBLICATIONS

Lathi "Modern Digital and Analog Communications Systems" 1989 pp. 69, 71.

Primary Examiner—Aristotelis Psitos
Assistant Examiner—James T. Wilson
Attorney, Agent, or Firm—Michael J. McGowan; Prithvi C. Lall; Michael F. Oglo

[57] ABSTRACT

A system, or appliqué apparatus, for recording and reproducing large numbers of electrical signals on input channel limited recording devices is described. It is accomplished by time sequencing groups of pluralities of separate input signals to a plurality of recording units within a recorder, wherein each recording unit handles a separate group of input signals. The time sequence is provided by a multiplexer controller and is common to each group. The plurality of recording units after recording the signals provide them in the groups in which they were received to respective demultiplexers. A demultiplex controller that receives 2 timing signals from the multiplex controller via the recorder supplies timing signals to the plurality of demultiplexers for reconstruction of the original input signals.

2 Claims, 7 Drawing Sheets

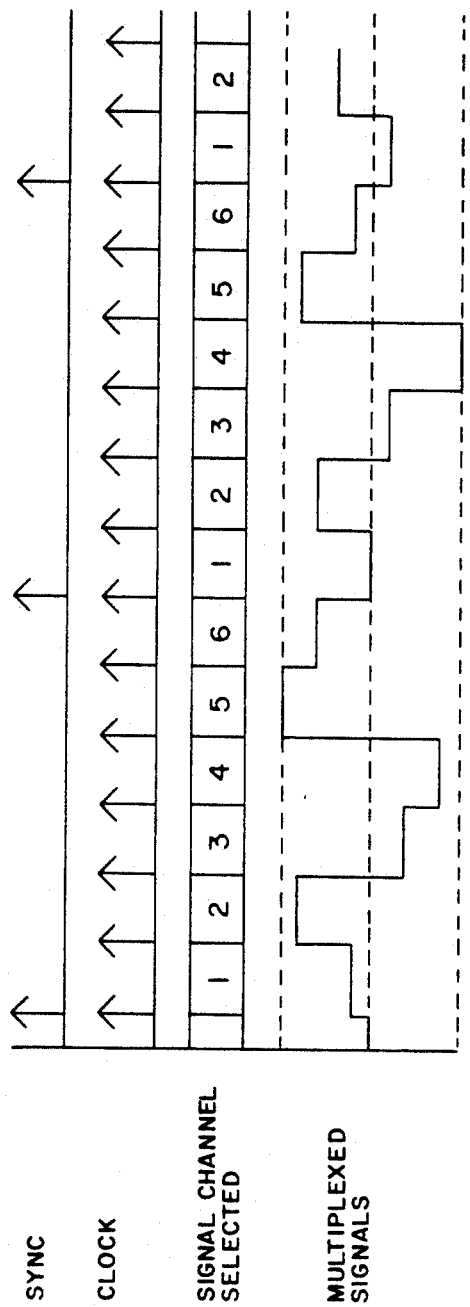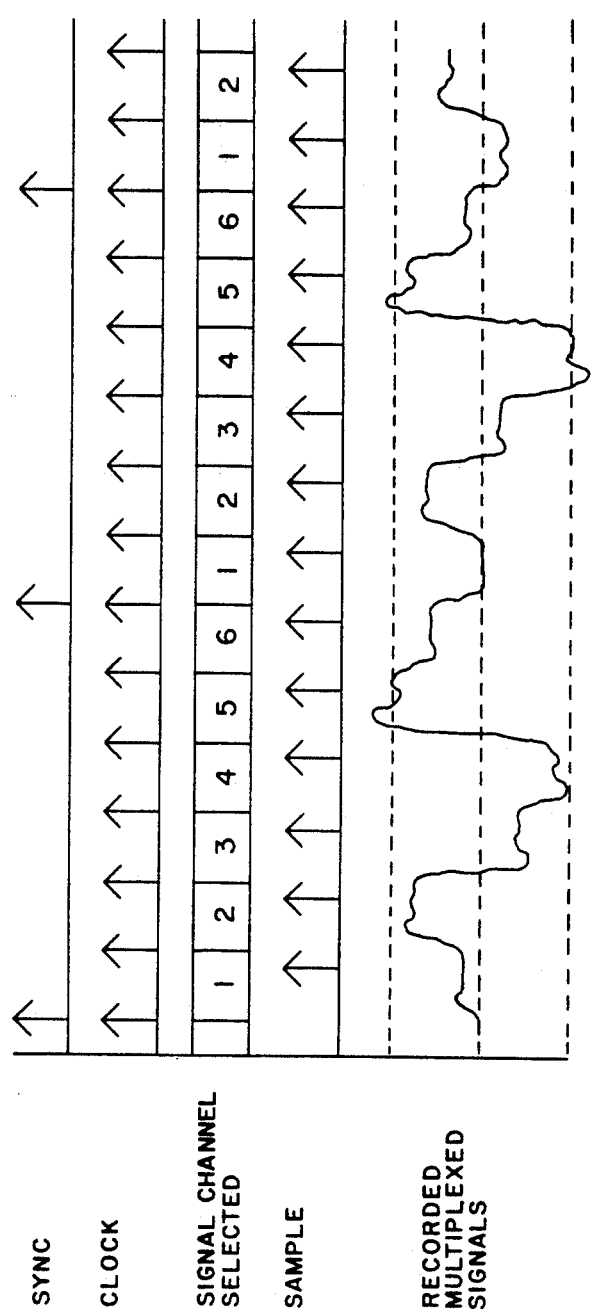

RECORDING SYSTEM USING MULTIPLEXED INPUTS TO A MULTICHANNEL RECORDER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention generally relates to multiple channel instrumentation recorders. More particularly the system incorporates a multiplexing and demultiplexing technique for use on input limited recording devices wherein the number of channels to be recorded exceeds the number of input channels.

(2) Description of the Prior Art

The invention described herein is applicable in situations where it is necessary to simultaneously record and recover multiple channels of certain types of electrical information on a tape recorder. Such information is characterized by continuous signals whose frequency bandwidths are low compared to the available bandwidths in the tape recorder channels recording them. In addition such information may include direct current (DC) within its bandwidth.

Conventional multiple channel instrumentation recorders are normally used to record such information. These recorders normally have two modes of recording, direct record and frequency modulation (FM) record. If the information bandwidth contains DC then the FM record mode is used. FIG. IA illustrates such a configuration. Six signals are simultaneously recorded on six channels of a multichannel instrumentation recorder configured in the FM record mode. These signals are recovered by playing back the tape.

In certain applications, the number of channels of information to be recorded simultaneously exceeds the number of channels available on the tape recorder and it is impractical to use more than one instrumentation recorder to achieve the number of channels required. Multiplexing an demultiplexing techniques are then used to record more than one channel of information on a single tape recorder channel and recover it. This is illustrated in FIG. 1B. When more than one information channel is multiplexed the excess bandwidth in the tape recorder is used to accommodate the additional channel(s) of information. The demultiplexing process reverses the multiplexing process to recover the information channel(s) from the single tape recorder channel.

Frequency division multiplexing and demultiplexing is commonly used in applications where multiple information channels are recorded and recovered from a single tape recorder channel. The process is very similar to the process of recording and reproducing using a single FM tape recording channel. Each information channel modulates an FM carrier which is recorded on a direct record tape recorder channel. The modulated carrier's frequency band is limited in such a way that it does not interfere with the other modulated carriers. This limitation causes each information channel bandwidth to be limited in a proportional manner. Recovery of the information channels is accomplished by using individual FM discriminators. Each discriminator is tuned in such a way as to allow the demodulation of a single modulated carrier in a manner that is quite similar to that used by FM broadcast radio receivers.

Frequency division multiplexing and demultiplexing is an efficient way to utilize excess tape recorder channel bandwidth to record and recover additional information channels. The greatest single objection to this method is likely to be the amount of precision analog hardware required to support it. Each multiplexer channel requires precise band limiting filters and a carefully tuned FM modulator. The demultiplexer requires precise band limiting filters and a carefully tuned FM demodulator. There are many instances where it would be appropriate to trade off efficient use of tape recorder bandwidth to achieve substantial hardware simplification.

SUMMARY OF THE INVENTION

Accordingly, it is a general purpose and object of the present invention to provide an improved multiple data source recorder. It is a further object that the recorder be an improved multiplex/demultiplex recorder. Stated in other terms, it is the general purpose and object of the present invention to provide applique' apparatus by which a commercially available recorder device may be improved. It is a further object that the recorder have a plurality of multiplex/demultiplex units. Other objects are that all multiplex units receive the same timing signals from single a controller and that all demultiplex units receive the same timing signals from a different single controller.

These and additional objects are accomplished with the present invention by providing a system in which common time signals are used to sequence a number of groups of input signals to a recording device that records each sequenced group separately. The signals are reconstructed using common time signals having the same origin as the common time signals used to sequence the input signals.

BRIEF DESCRIPTION OF THE DRAWINGS

FIGS. 5a and 5b are timing diagrams associated with the signal channel selected in the operation of the multiple channel instrumentation recorder of FIG. 3;

DESCRIPTION OF THE PREFERRED EMBODIMENT

Figure 1A:
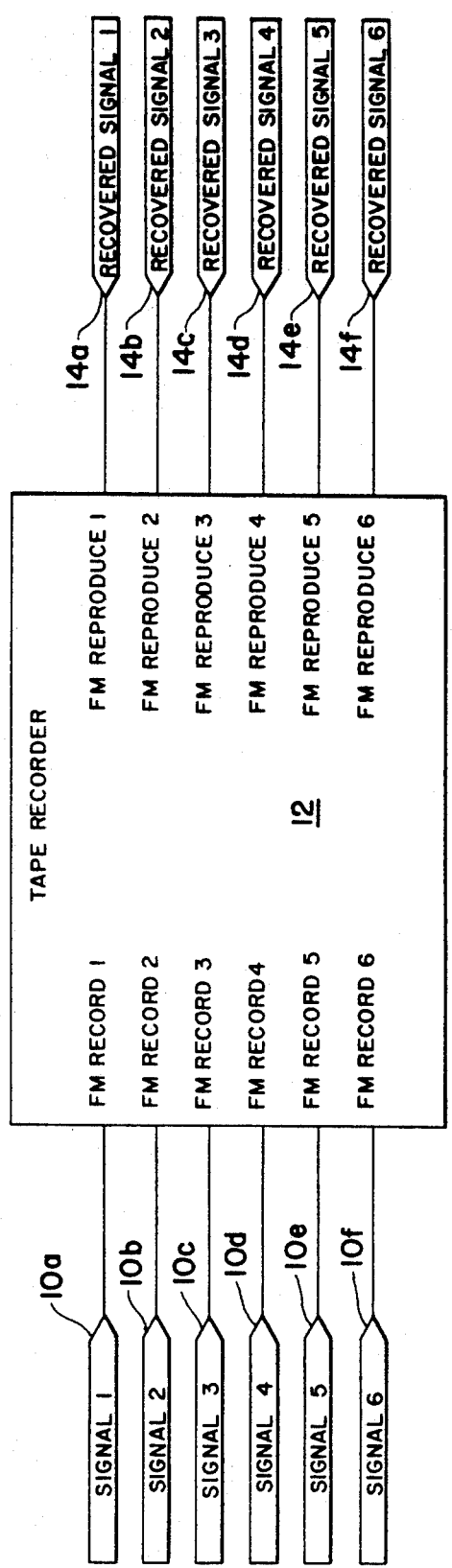
FIGS. 1a and 1b are block diagrams depicting conventional prior art multiple channel instrumentation recorders.
Figure 1B:
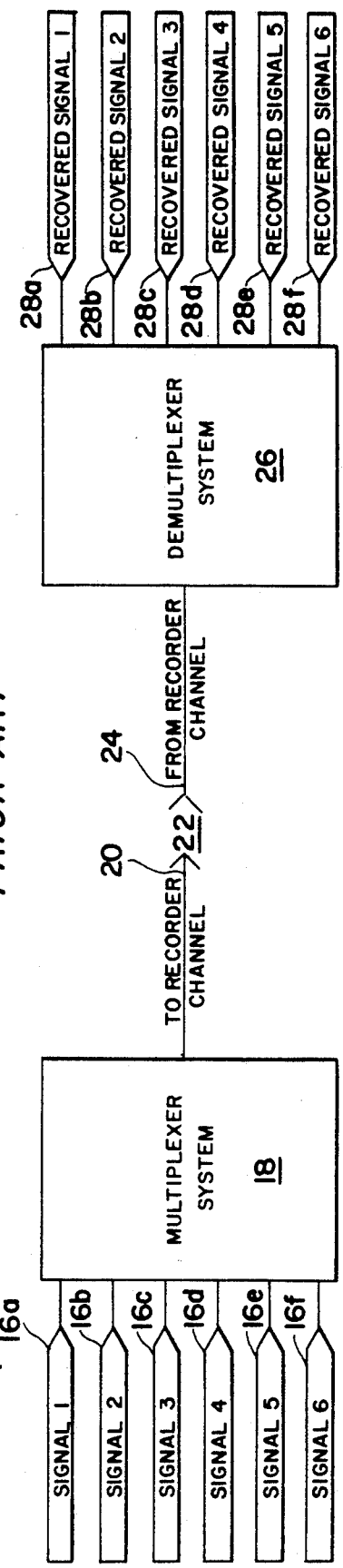

Referring now to FIGS. 1a and 1b there is shown the prior art devices mentioned in the Background of the Invention. In FIG. 1a a plurality of input signals 10a–f are received by a multichannel instrumentation tape recorder 12. The tape recorder 12 simultaneously records all input signals 10a-f. The reproduced signals, which are replicas of input signals 10a-f, are shown as recovered signals 14a-f. In FIG. 1b a plurality of input signals 16a-f are applied to a multiplexer system 18 and a single multiplexed signal is applied over line 20 to a recorder 22. The recorded signal on line 24 is a replica of the signal on line 20, and is applied to a demultiplexer system 26. The demultiplexer system reproduces the recovered signals 28a-f which are replicas of the input signals 16a-f.

Figure 2:
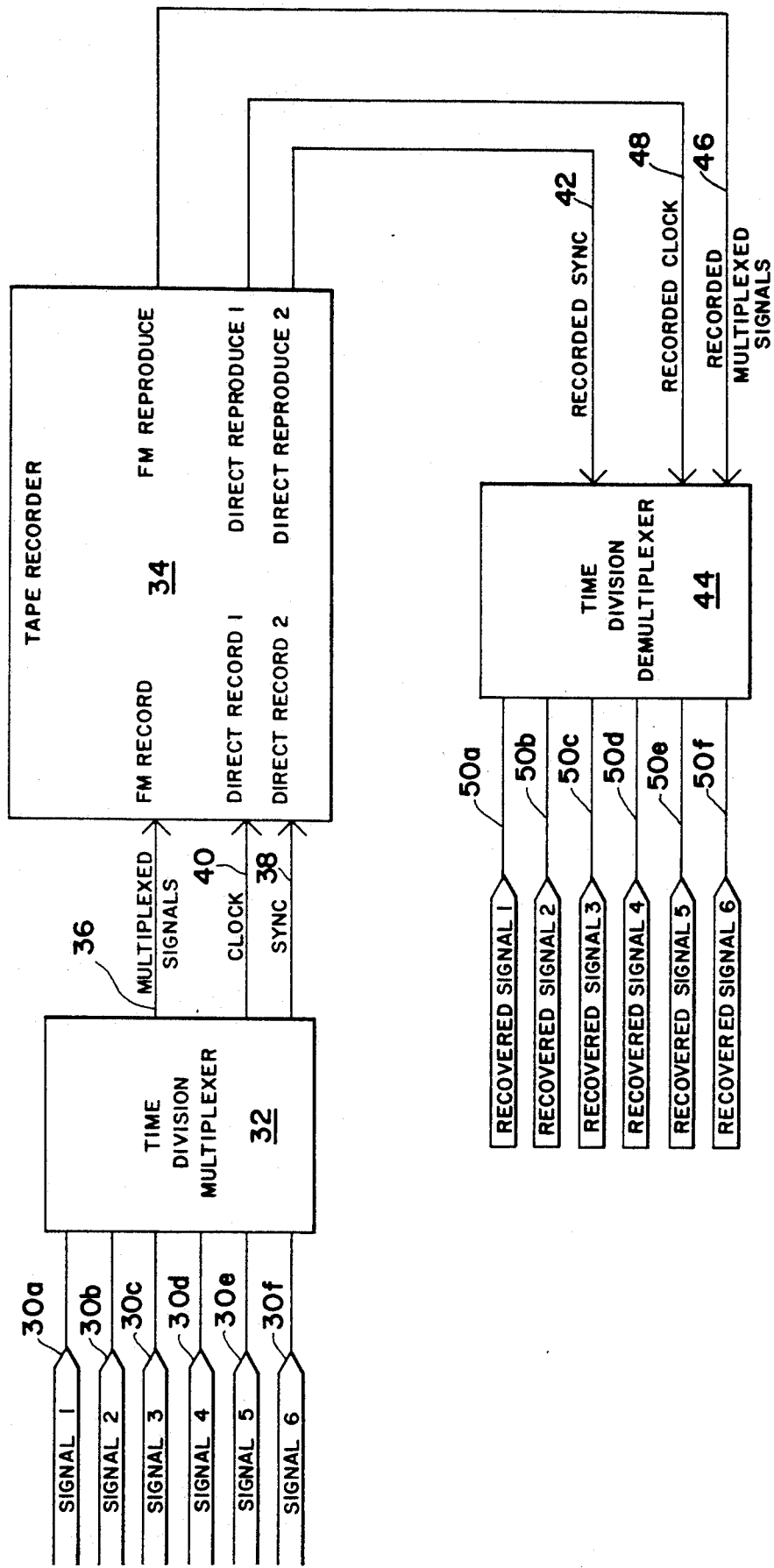
FIG. 2 shows a block diagram of a multiple channel instrumentation recorder in accordance with the present invention.

The time division multiplexing/demultiplexing tape recording concept of the present invention simplifies the hardware requirements for recording and reproducing multiple information channels on a single tape recorder channel. FIG. 2 illustrates the basic concept for a single tape recording channel. The advantage of this concept becomes evident when several tape recorder channels use this method as illustrated in FIG. 3.

Each input signal 30a-f shown in FIG. 2 is sampled sequentially by the time division multiplexer 32. Beginning with input signal 1 30a, each input signal 30a-f is sampled. After the time division multiplexer 32 finishes sampling input signal 6 30f, it returns to input signal 1 30a and repeats the process. The multiplexed signals 36 are sent to tape recorder 34 and then recorded on a single FM record channel. Accompanying the multiplexed signals are SYNC 38 and CLOCK 40 signals which are recorded on separate direct record channels. It will be appreciated that tape recorder 34 (as well as tape recorder 70, FIG. 3 to be discussed in the next stage of this description of the invention) preferably are of the type having the two modes of recording hereinbefore discussed in the "Description of Prior Art" subdivision of the "Background of the Invention" section of this specification. These two mode are "direct record" and "frequency modulation (FM) record", and each recorder channel is selectively switchable (switches not shown) to operate in one or the other of these modes. The SYNC signal 38 provides a time reference for each time the time division multiplexer 32 returns to sample signal 1 30a. The CLOCK signal provides a time reference for each input signal sample 30a-f.

During playback the recorded SYNC signal 42 initializes the time division demultiplexer 44 such that it recovers the recorded input signal 1 sample 46 as that sample emerges from the tape recorder 34 channel. The recorded CLOCK signal 48 then causes that and the subsequent five recorded input signal samples 46 to be recovered. After the sample for the input signal 6 30f has been recovered the next recorded SYNC 42 arrives causing the time division demultiplexer 44 to repeat the process. The recovered signals 50a-f are replicas of respective input signals 30a-f.

Figure 3:
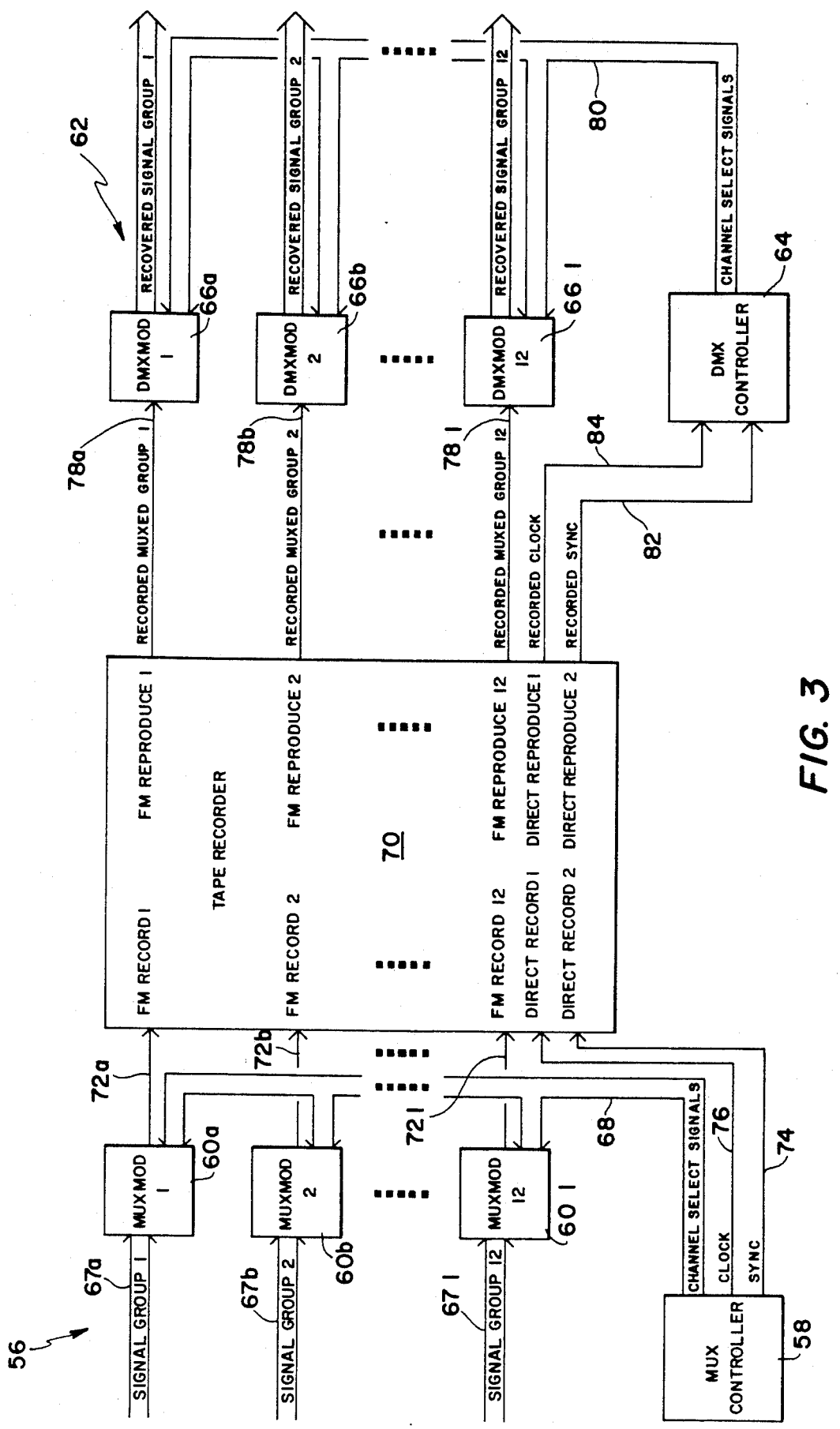
FIG. 3 shows a block diagram of a multiple channel instrumentation recorder combining a plurality of the multiplexing units shown in FIG. 2.

A time division multiplexer subsystem 56 comprises a multiplexer (MUX) controller 58 and one or more multiplexer modules (MUXMODs) 60A-1 as shown in FIG. 3. Similarly, a time division demultiplexer subsystem 62 comprises a demultiplexer (DMX) controller 64 and one or more demultiplexer modules (DMXMODs) 66a-l. Signals being recorded are organized in signal groups 67a-l of 6 signals each. For each signal group 67a-l a respective MUXMOD 60a-l sequentially samples 6 signals as described above with reference to FIG. 2. Each MUXMOD 60a-l then forwards a time multiplexed signal 72a-l for each signal group to a tape recorder 70. The signal source sampled for each signal group is controlled by the channel select signals 68 which consist of a 3 bit digital code. For example, when this code is set to 100 all MUXMODs 60a-l are sampling input signal 1 in their respective signal groups 67a-l. When this code is 101, signal source 6 is sampled. Because all MUXMODS 60a-l are constrained in this way the signals of only one SYNC 74 and one CLOCK 76 need to be recorded. Referring to FIG. 3, tape recorder 70 is schematically represented by a block. The input side of each of the recorder's channels conventionally has a recorder means, and the output side conventionally has a reproducing means. This is indicated by the words "record" or "reproduce" in the inscriptions representing the input or output of each channel. When signal retrieval is desired, tape recorder 70 forwards the recorded time multiplexed signals 78a-l. Demultiplexing is accomplished in the same fashion as described above, with reference to FIG. 2, except that all signal groups are recovered simultaneously via their respective DMXMODs 66a-l. As with the MUXMODs 60a-l, the DMXMODs 66a-l share common channel select signals 80 from DMX controller 64. These signals 80 are derived from the recorded SYNC 82 and CLOCK 84 signals.

It will be appreciated that the provision subsystems 56 and 62 tape recorder 70's mode-of-recording-switches (not shown) to record time multiplexed signals 67a-l in channels 1-12 in their FM recording modes and to record the SYNC and CLOCK signals in two other channels in their direct recording modes constitutes appliqué apparatus for extending the input signal channel capacity of recorder 70.

Figure 4A:
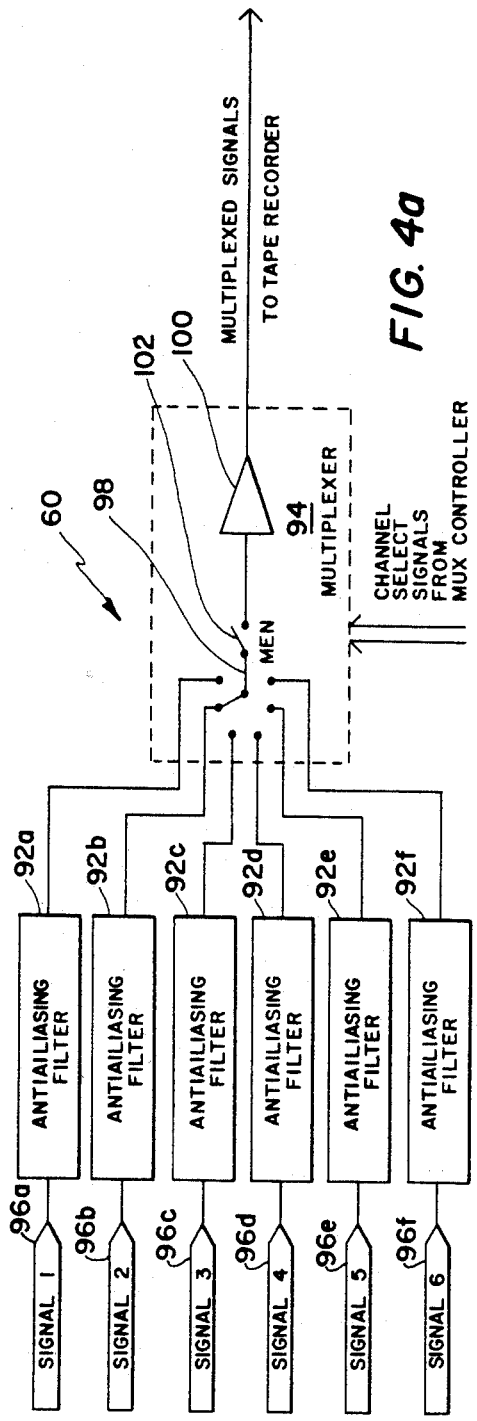
FIGS. 4a and 4b show more detailed diagrams of the respective MUXMOD and DMXMOD block diagrams of FIG. 3.

Each of the MUXMODs 60a-l in FIG. 3 is identical and is shown in greater detail as the MUXMOD 60 in FIG. 4a. The MUXMOD 60 comprises 6 antialiasing filters 92a-f and a multiplexer 94. The antialiasing filter bandlimits the input signals 96a-f. Most sampled data systems require such filters to prevent co-channel interference that might be caused when a sampled signal's frequency components exceed one half of the sampling rate and thus violates the Nyquist Criteria. Selection and sampling of an input signal is accomplished by the multiplexer 94. In the multiplexer 94, the functional equivalent of a six pole rotary switch 98 selects which one of the input signals 96a-f is to be sampled. A sample and hold amplifier 100 samples and freezes the signal voltage level for the duration of time that the signal is selected. The functional equivalent of a single pole single throw switch, multiplexer enable (MEN) 102 facilitates the sampling process.

Figure 4B:
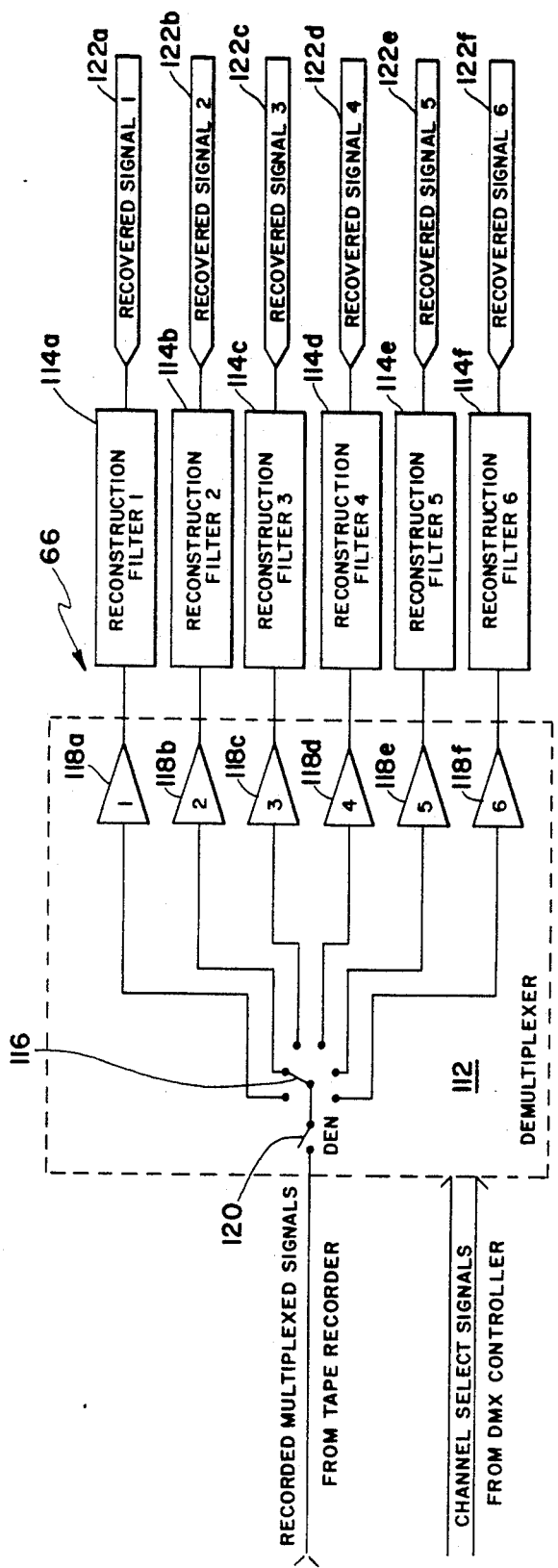

Each of the DMXMODs 66a-l in FIG. 3 is identical and is shown in greater detail as the DMXMOD 66 in FIG. 4b. The DMXMOD 66 comprises a demultiplexer 112 and six reconstruction filters 114a-f. In the demultiplexer 112, the functional equivalent of a 6 pole rotary switch 116 selects one of the sample and hold amplifiers 118a-f. Also selected by switch 116 are reconstruction filters 114a-f corresponding to the recorded input signal sample to be recovered. Each sample and hold amplifier 118a-f samples and freezes the voltage level of the recorded sample at an appropriate instant during its selection time. Sampling is facilitated by the functional equivalent of a single pole single throw switch demultiplexer enable (DEN) 120. Each sample and hold amplifier 118a-f, in turn, maintains this level until the next sample for this channel is recovered. The outputs of amplifiers 118a-f comprised sequence quantum voltage levels. Extraneous interfering signal components caused by quantization are removed by the reconstruction filters 114a-f resulting in recovered signals 122a-f.

In order to recover the original signals from the recorded multiplexed signals, the correct timing relationship between the recorded signal source samples and the demultiplexer sampling actions must be established. When the multiplexed signals are generated the MUX controller 58 of FIG. 3 generates the SYNC 74 and CLOCK 76 signals which uniquely establish this relationship. FIG. 5a illustrates the timing relationship between the SYNC and CLOCK signals and the signals which are multiplexed. When the SYNC and CLOCK signals are recorded simultaneously with the multiplexed signals, a signal channel timing relationship is preserved such that the same relationship exists during playback. This timing relationship is designated MUXMOD channel select signals 68, FIG. 6a in the next stage of description of the invention. During playback the DMX controller 64 of FIG. 3 translates the recorded signals into the appropriate channel select signals which as mentioned are designated DMXMOD channel select signals 80 in FIG. 6b. These appropriate signals, in turn select the proper reconstruction channel in turn causing subsystem 6b to sample its corresponding signal sample. FIG. 5b illustrates this timing relationship.

FIG. 5a implies that sampling is done near the signal channel selected transition times. As long as such transitions are in steady state this is valid as long as timings between CLOCK samples are constant. For reconstruction, however, sampling actions are shown as occurring separately in time from CLOCK, in FIG. 5b. Bandwidth imitations of the tape recorder 70 of FIG. 3 cause the recorded multiplexed signals to be shaped by the transient response of the tape recorder 70 channel. Sampling actions are timed relative to the CLOCK in such a way as to minimize the effect of the tape recorder 70 transient response upon the reconstructed signals.

There is a practical limit to how accurately reconstruction can be done which is inherent in the transient response of the tape recorder channels. Any such channel has a transient response which is related to its bandwidth. Mathematical convolution techniques demonstrate that when a series of contiguous quantized voltage levels are passed through such a channel, adjacent levels interfere with each other to some degree. Such interference manifests itself as a form of crosstalk between adjacent input signal channels. This interference is not uncommon in digital communication applications. The severity of this interference and thus the accuracy of reconstruction worsens as the tape recorder bandwidth is reduced. A channel with a tendency to ring excessively can by itself cause excessive time smearing even if its bandwidth limitation isn't particularly severe.

Figure 6A:
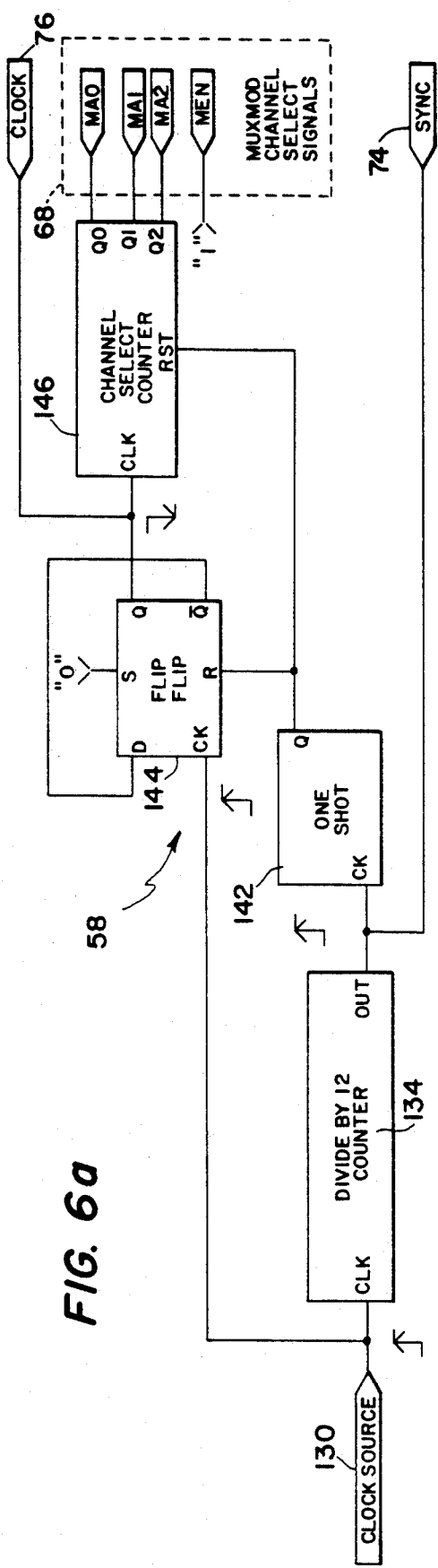
FIGS. 6a and 6b are block diagrams of the respective MUX and DMX controllers of FIG. 3.
Figure 6B:
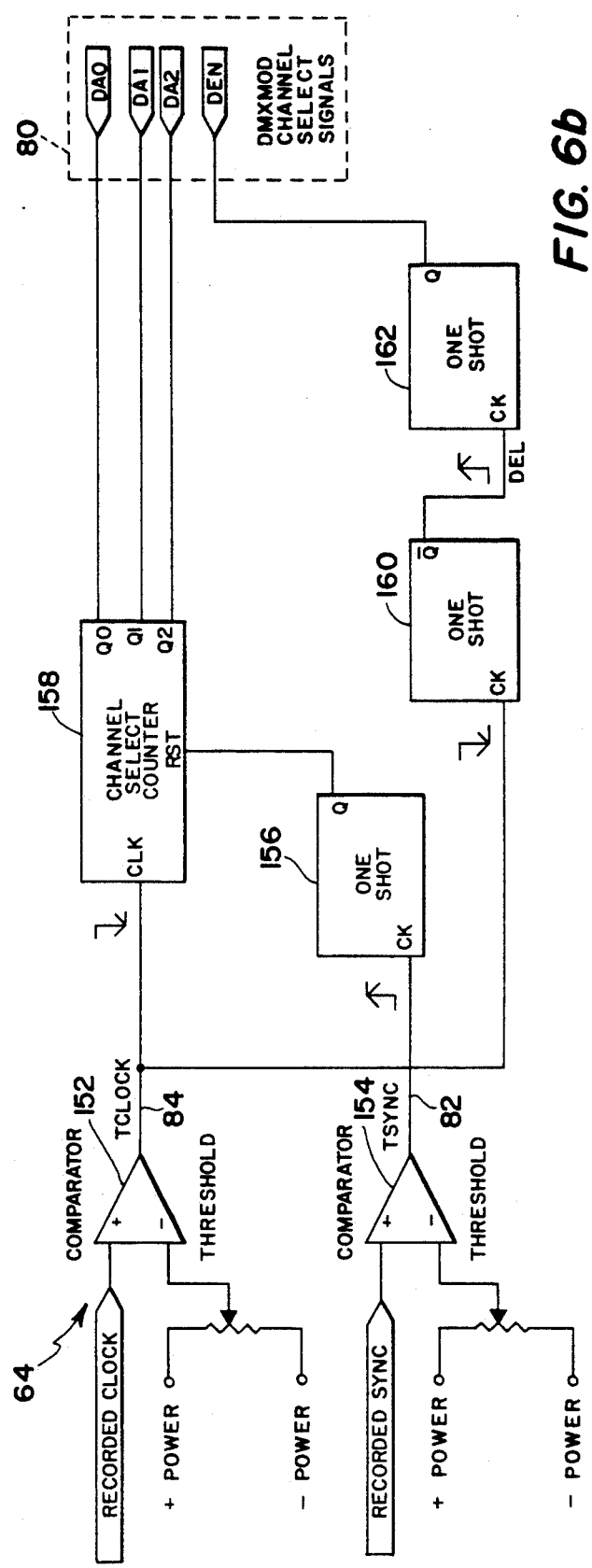

Logic diagrams for the MUX controller 58 of FIG. 3 and the DMX controller 64 of FIG. 3 are presented in FIGS. 6a and 6b respectively. Timing diagrams for the MUX controller 58 and the DMX controller 64 appear in FIGS. 7a and 7b respectively. These diagrams reflect the actual logic used in the engineering prototype. However, other realizations may be used to achieve the same degree of functionality. The clock rates are dependent upon the bandwidth of the tape recorder 70 channels. An internal clock source 130 in the MUX controller 58 governs the clock rates for both the MUX and DMX controllers 58 and 64, respectively. The clock source 130 has been chosen such that its frequency is roughly equal to the bandwidth of the tape recorder FM record channels. Direct record channels for the SYNC and CLOCK signals have bandwidths which are roughly 7.5 times the frequency of the clock source. The individual allowable input group bandwidth is roughly equal to 1/50th of the FM record bandwidth.

Figure 7A:
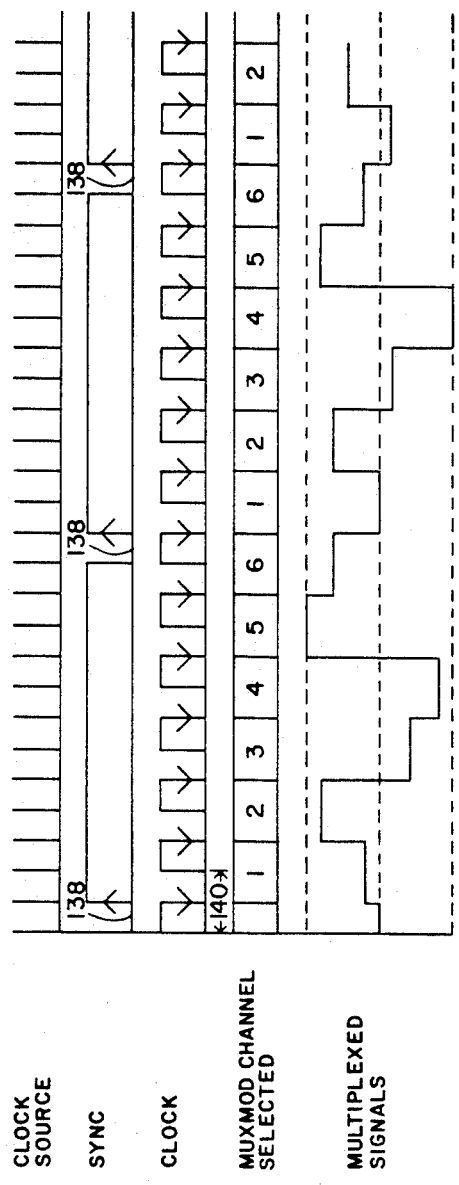
FIGS. 7a and 7b are timing diagrams associated with the MUXMOD and DMXMOD channel selected in the operation of multiple channel instrumentation recorder of FIG. 3.

In FIG. 6a the clock source frequency is divided by 2 by the flip flop 144 to derive the CLOCK signal 76. A divide-by-12 counter 134 divides the frequency of this same clock source to derive the SYNC signal 74. The CLOCK signal 76 has a 50% duty cycle while the SYNC signal 74 has an active low duration 138 equal to one half of a CLOCK period 140 as shown in FIG. 7a. Each rising edge of the SYNC coincides with every 12th clock source pulse. In this way a rising edge of SYNC coincides exactly with the falling edge of every 6th CLOCK pulse. A one shot 142 translates the rising edge of SYNC 74 into a narrow pulse which initializes the flip flop 144 and a channel select counter 146. After initialization the channel select counter 146 is set to the digital code which corresponds to the first signal group to be sampled. MUXMOD channel select signals 68 MA0, MA1, and MA2 carry this selection to the MUXMODS 60a-l of FIG. 3. The MEN signal is always active. The first channel remains selected until the falling edge of the first CLOCK pulse after which time the counter is incremented and the second channel is selected and so forth. Each channel is active for one CLOCK period 140 during which time sampling takes place. The multiplexed signals, the SYNC 74 and the CLOCK 76 signals are then recorded as described previously with reference to FIG. 3. The entire process repeats itself after the falling edge of the 6th CLOCK pulse.

Figure 7B:
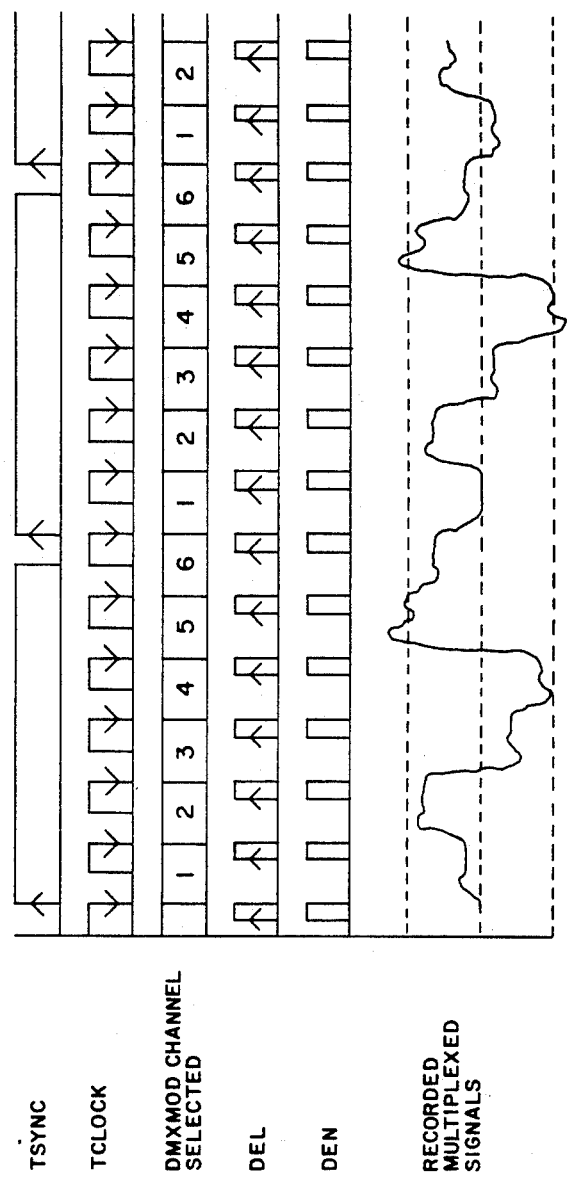

Bandwidth characteristics of the tape recorder 70 direct record channels, shape the SYNC 74 and CLOCK 76, and shift their DC levels. Comparators 152 and 154 are used, as shown in FIG. 6b, to restore the compatibility of the recorded TSYNC 82 and TCLOCK 84 signals with the digital logic. The rising edge of TSYNC 82 triggers a one shot 156 which, in turn, creates a narrow pulse used to initialize the channel select counter 158. After initialization this counter 158 is set to the first channel to be demultiplexed. The falling edge of TCLOCK 84 just prior to the rising edge of TSYNC 82 has already triggered a one shot 160 whose output, delay (DEL) is used to trigger a second one shot 162. The output of the second one shot 162, DEN, is used to sample the recorded multiplexed signals. DMXMOD channel select signals 80 DA0, DA1 and DA2 establish the DMXMOD reconstruction channel which samples the recorded multiplexed signals. As shown in FIG. 7b, the duration of DEL is chosen such that DEN occurs during the most meaningful part of each recorded multiplexed signal sample. It is to be appreciated that DEL and DEN do no coexist in time. The DEL is an active low signal such that the time delay is enforced while DEL is LOW. The transition of DEL from LOW to HIGH, as indicated by the arrows on DEL in FIG. 7b, causes DEN to be triggered HIGH. As such, the pulse width of DEL is inconsequential as long as it is of sufficient duration to trigger DEN. After the falling edge of the first TCLOCK the channel select counter is incremented so that the next reconstruction channel can sample its corresponding recorded sample and so forth. The entire process repeats itself after the falling edge of the 6th TCLOCK pulse.

There has therefore been described an improved data recording system. The system is capable of recording large numbers of input signals on a limited number of tape recorder channels thereby reducing costs and hardware complexity while giving improved reproduction quality.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. Apparatus which is attached to extend the channel capacity of an n-channel utilization recorder device to record and reproduce p input signals, where p is a number significantly larger than n, and n is a number larger than 2, said utilization recorder device being of a type having its record channels each individually selectively switchable to operate in one of a frequency modulation FM mode and direct recording mode, comprising the combination:

each of the n channels of the utilization recorder device comprising a recording means and a reproducing means;

no more than n−2 of the utilization recorder device's n channel being switched to operate in their FM mode;

no less than 2 of the utilization recorder device's n channels being switched to operate in their direct recording mode;

a set, consisting of a number no larger than the number of those of the n utilization recorder device's channels that are switched to operate in their FM mode, of multiplexer modules with each module comprising input means for receiving a subset of said p input signals, time multiplexing means for time multiplexing said subset of input signals, and output means for providing said subset of input signals in the form of time multiplexed signals;

a multiplexer controller comprising timing means for generating a clock signal, a sync signal and channel select signals, and first output means for providing outputs of said channel select signals to each of said multiplexer modules, and second output means for providing outputs of said clock and sync signals;

the individual multiplexer modules of said set each being connected to the recording means of a different channel that has been switched to operate in the FM mode, whereby the time multiplexed signals formed from subsets of the p input signals are recorded in the connected utilization channel;

said clock signals being connected to the recording means of a first of those of the n utilization recorder device's channels that are switched to operate in their direct recording mode and said sync signal being connected to the recording means of a second of the n utilization recorder device's channels that are switched to operate in their direct recording mode, whereby the clock and sync signal signals are recorded in the aforesaid first and second channels, respectively;

a demultiplexer controller connected to the aforesaid first and second of those of the n utilization recorder device's channels that are switched to operate in their direct recording mode, said demultiplexer controller comprising processing means for processing said reproduced clock and sync signals and generating channel select signals, said demultiplexer controller further comprising output means for providing said channel select signals;

a corresponding set of demultiplexer modules each connected to the output means of the corresponding one channel of those of the n utilization recorder device's channels that are switched to operate in their FM recording mode, and each further connected to said demultiplexer controller's output means, each of said demultiplexer modules having demultiplexing means for providing replicas of the corresponding subset of input signals;

the individual multiplexer modules of each set further comprising a plurality of antialiasing filters with each of said antialiasing filters connected to receive and process respective input signals of the corresponding subset of p signals;

the individual multiplexer modules of each set still further comprising a selection means for sequentially selecting signals from said antialiasing filters for predetermined periods of time and for providing said time multiplexed signals;

each selection means of a multiplexer module further comprising a selector switch providing said sequentially selected signals;

each selection means of a multiplexer module each further comprising a multiplexer enable switch connected to said selector switch to receive and determine conduction of said sequentially selected signals;

each selection means of a multiplexer module even further comprising a sample and hold amplifier connected to said multiplexer enable switch for sampling the conducted sequentially selected signals and freezing each of their voltages for an instant and providing said voltages as said multiplexer module's time multiplexed signal signals;

each individual multiplexer module of said set further comprising a selection means for receiving recorded signals of a respective multiplexer module's output signal from said first output means of utilization recorder device's corresponding channel for sequentially selecting subset signals indicative of the subset of p input signals of the corresponding multiplexer for predetermined periods of time and for providing a sequence of quantum voltage levels of said sequentially selected signals;

each individual demultiplexer module of said set still further comprising a plurality of reconstruction filters with each filter connected to said selection means of the associated demultiplexer module for receiving said selection means sequence quantum voltage levels of said sequentially selected signals, said reconstruction filters removing extraneous interfering signal components caused quanitzation associated with the operation of said selection means of the associated demultiplexer module;

each selection means of a demultiplexer module further comprising a demultiplexer enable switch connected to the reproduction means of the corresponding utilization recorder device channel to receive and determine conduction of said recorded signals of the corresponding multiplexer's output signal;

each selection means of a demultiplexer module still further comprising a selector switch connected to said demultiplexer enable switch to sequentially select signals indicative of said input signals of said respective multiplexer;

each selection means of a demultiplexer module still further comprising a sample and hold amplifier connected to said selector switch to provide sequence quantum voltage levels of said sequentially selected signals;

said timing means of said multiplexer controller further comprising a clock source providing a clock frequency signal;

said timing means of said multiplexer controller further comprising a flip-flop connected directly to said clock source, said flip-flop dividing said clock source frequency by two for providing said clock signal to said recorder;

said timing means of said multiplexer controller even further comprising a divide by twelve counter connected directly to said clock source for dividing said clock source frequency by twelve to provide said sync signal to said recorder;

said timing means of said multiplexer controller yet further comprising a one shot connected directly to said divide by twelve counter to receive said sync signal therefrom;

said flip-flop also being connected directly to said one shot to receive an output therefrom; and said timing means of said multiplexer controller even yet further comprising a channel select counter connected directly to receive an output from said flip-flop to provide output signals to each of said multiplexer modules.

2. Apparatus according to claim 1 wherein said demultiplexer controller further comprises:

a first comparator connected directly to the reproducer means of the aforesaid first channel of those of the n utilization recorder device's channels that are switched to operate in their direct recording mode to receive said recorded clock signals for restoring the compatibility of said recorded clock signals with the digital logic;

a second comparator connected directly to the reproducer means of the aforesaid second channel of those of the n utilization recorder device's channels that are switched to operate in their direct recording mode to receive said recorded sync signals for restoring the compatibility of said recorded clock signals with the digital logic;

a one shot connected directly to the output of said second comparator;

a channel select counter connected directly to the outputs of said first comparator and said one shot for providing said channel select signals to each of said plurality of demultiplexer modules; and a pair of one shots serially connected directly to to receive the output thereof, said pair of one shots serving to provide said first comparator for providing a demultiplexer enabling signal to said demultiplexer modules.

* * * * *